(12) United States Patent
Creger

(10) Patent No.: US 6,920,971 B2
(45) Date of Patent: Jul. 26, 2005

(54) CUSHIONED HYDRAULIC CLUTCH/BRAKE PISTON

(75) Inventor: Todd D. Creger, Geneva, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/417,635

(22) Filed: Apr. 17, 2003

(65) Prior Publication Data

US 2004/0206597 A1 Oct. 21, 2004

(51) Int. Cl.$^7$ .......................................... F16D 25/0638
(52) U.S. Cl. .............................. 192/85 AA; 192/109 F
(58) Field of Search ............................ 192/52.4, 85 AA, 192/109 F, 109 A, 109 D; 188/71.5, 72.4

(56) References Cited

U.S. PATENT DOCUMENTS

| | | | |
|---|---|---|---|
| 3,353,641 A | * 11/1967 | Chana | ................... 192/85 AA |
| 3,612,237 A | 10/1971 | Honda | |
| 3,650,364 A | 3/1972 | Laing | |
| 3,690,429 A | 9/1972 | Honda | |
| 3,693,480 A | * 9/1972 | Lemieux | ..................... 475/128 |
| 3,724,626 A | 4/1973 | Clause, Jr. et al. | |
| 3,915,274 A | 10/1975 | Utter | |
| 4,020,933 A | 5/1977 | Gill | |
| 4,144,955 A | 3/1979 | Garnier | |
| 4,186,829 A | 2/1980 | Schneider et al. | |
| 4,664,242 A | * 5/1987 | Downs | ................... 192/106 F |
| 4,724,941 A | * 2/1988 | Wirkner | .................... 192/52.2 |
| 4,957,195 A | 9/1990 | Kano et al. | |
| 5,054,599 A | * 10/1991 | Marcott | .................... 192/85 R |
| 5,701,976 A | * 12/1997 | Kumagai et al. | .......... 188/71.5 |
| 6,035,989 A | 3/2000 | Matsuoka | |

* cited by examiner

Primary Examiner—Richard M. Lorence
(74) Attorney, Agent, or Firm—Finnegan, Henderson, Farabow, Garrett & Dunner

(57) ABSTRACT

A hydraulic clutch/brake mechanism has an actuator piston assembly therein to control actuation of the associated clutch/brake. The actuator piston assembly has a damping arrangement disposed therein that is operative to damp the movement of the actuator piston assembly relative to a plurality of disks located therein and to establish an end-of-fill.

13 Claims, 2 Drawing Sheets

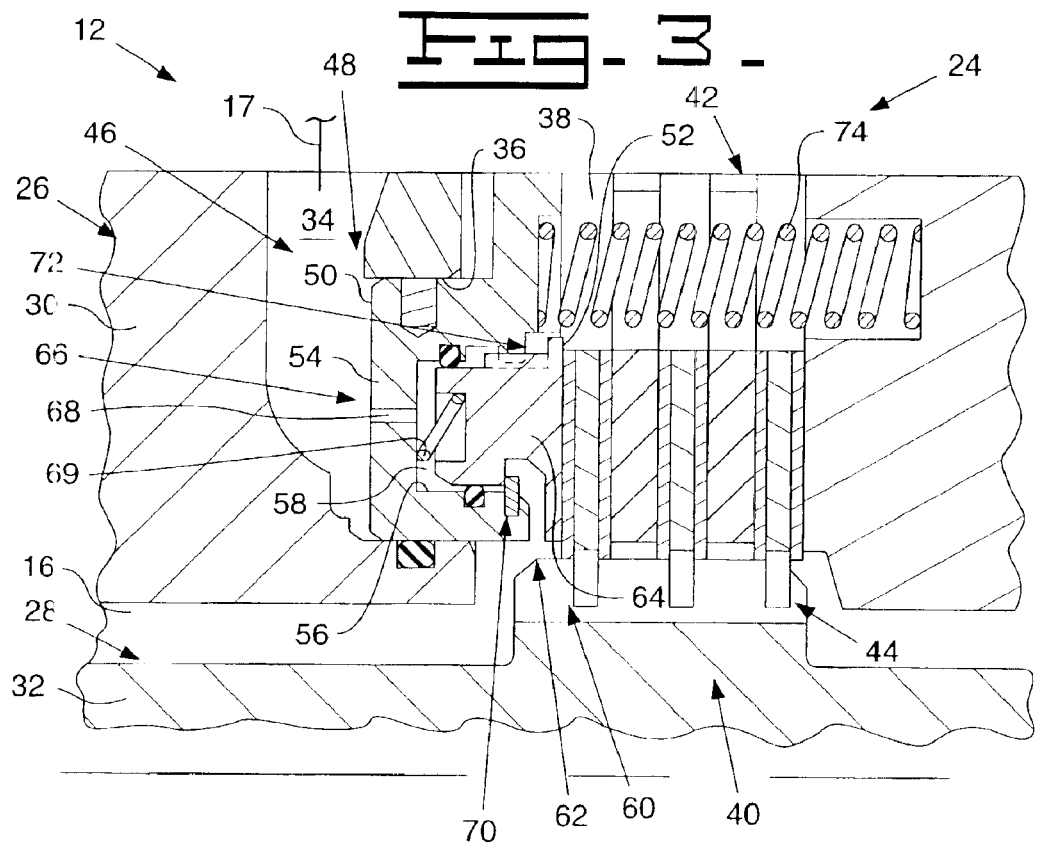
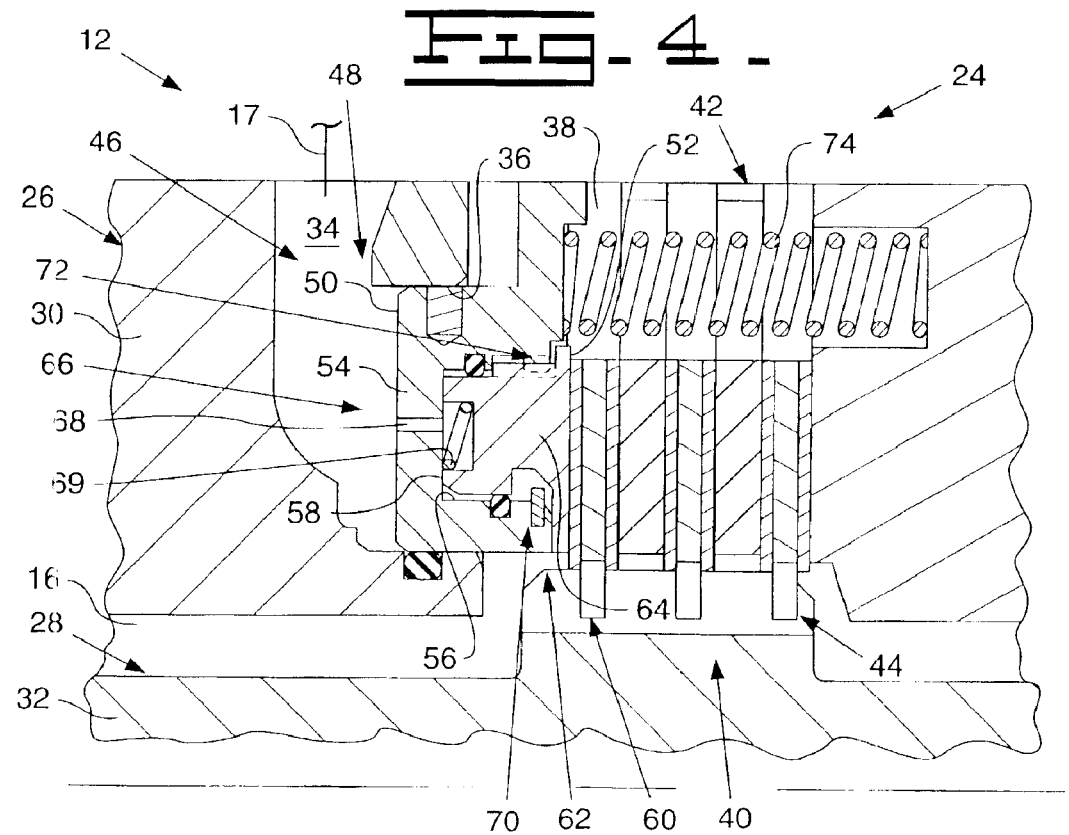

CUSHIONED HYDRAULIC CLUTCH/BRAKE PISTON

TECHNICAL FIELD

This invention relates generally to a hydraulic clutch/brake piston and detection of the end-of-fill of the clutch during engagement thereof and, more particularly, to a cushioned hydraulic clutch/brake piston.

BACKGROUND

Various arrangements have been provided in hydraulic clutch/brake pistons to overcome the slippage or momentary torque spikes (harsh engagement) between the disks located therein when an input torque is being transmitted therethrough or a braking or stopping effort is applied to the output thereof. It is recognized that the various arrangements could be hydraulic clutch arrangements or hydraulic brake arrangements. Slippage occurs when the disks are not fully in contact and torque is being delivered therethrough. Since the disks are not fully in contact, torque cannot be delivered therethrough. This is true because the disks slip one relative to the other. On the other hand, harsh engagement occurs when the disks are moved into forced contact prior to the torque being delivered therethrough. Since the disks are in full, forced contact, initiation of torque therethrough results in a jerk or sudden output being transmitted to the output. Additionally, it is desirable to detect or know when the end-of-fill occurs so that the input torque may be applied at the proper time. End-of-fill is the point at which all entrained air spaces between the respective disks and actuator piston are removed and the respective disks and actuator piston are in close, intimate contact. At this point, the hydraulic clutch/brake mechanism is in condition to begin transmitting torque therethrough. In some known systems, it has been necessary to calculate the needed flow and then precisely control the open of the control valve for a predetermined length of time in order to move the actuator piston to a position that is calculated to be the position of end-of-fill. Since this is a calculated procedure, there are many variables that affect its accuracy and consequently, its ability to reduce slippage and/or jerk at the point that torque is transmitted therethrough is minimized. One such arrangement to overcome harsh engagements is illustrated in U.S. Pat. No. 3,650,364 issued Mar. 21, 1972 to James Morrison Laing. This patent teaches the use of two separate actuator pistons for engagement. Pressurized fluid is applied to an area of one of the pistons to urge the disks into initial engagement with each other, then the pressurized fluid is directed through an orifice to simultaneously act on an area of the second piston to fully apply the clutch. Even though this arrangement does help to offset harsh engagements, it does not provide any cushioning or damping of the engagement of the disks nor does it provide any indication as to when the end-of-fill has been reached.

The subject invention is directed to overcoming one or more of the problems as set forth above.

SUMMARY OF THE INVENTION

In one aspect of the present invention a hydraulic clutch/brake mechanism is provided to ensure a smooth clutch/brake application. The hydraulic clutch/brake mechanism includes an arrangement defining a fluid inlet port, a piston bore in open communication with the fluid inlet port, a disk chamber adjacent to the piston bore, and first and second torque transmitting members. A plurality of disks is disposed in the disk chamber and intermeshed one with the other and has a first portion of the disks thereof connected with the first torque transmitting member and a second portion of the disks thereof connected with the second torque transmitting member. An actuator piston assembly is slideably disposed in the piston bore and the actuator piston assembly has a first side thereof in communication with the fluid inlet port and a second side thereof disposed adjacent the plurality of disks. A damping arrangement is disposed in the actuator piston assembly and is operative during operation to damp the movement of the actuator piston assembly relative to the plurality of disks.

In another aspect of the subject invention a method is provided for damping the actuation of a clutch/brake mechanism. The method includes the steps of providing an arrangement including first and second torque transmitting members, a fluid inlet port, a piston bore in open communication with the fluid inlet port, and a disk chamber adjacent to the piston bore; locating a plurality of disks in the chamber with a first portion of the disks thereof connected with the first torque transmitting member and a second portion of the disks thereof intermeshed with the first portion of the disks and connected with the second torque transmitting member; providing an actuator piston assembly slideably disposed in the piston bore between the fluid inlet port and the plurality of disks; and disposing a damping arrangement in the actuator piston assembly to damp the movement of the actuator piston assembly.

BRIEF DESCRIPTION OF THE DRAWINGS

FIG. 3 is a diagrammatic representation of the portion of the hydraulic clutch/brake mechanism of FIG. 2 in its initially actuated condition; and FIG. 4 is a diagrammatic representation of the portion of the hydraulic clutch/brake mechanism of FIG. 3 in its fully actuated condition.

DETAILED DESCRIPTION

Figure 1:
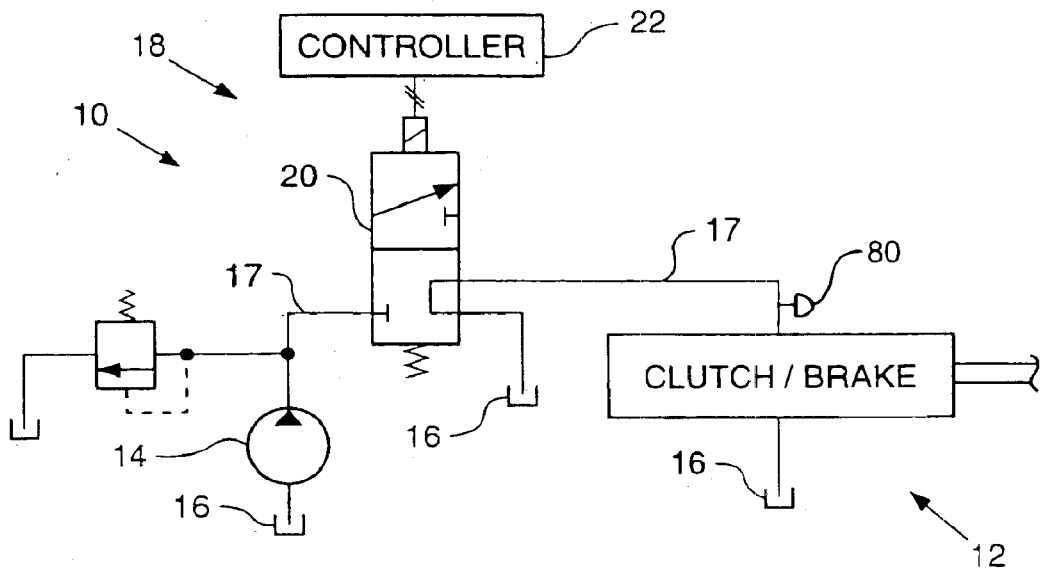
FIG. 1 is a schematic illustration of a hydraulic clutch/brake system incorporating the subject invention.

Referring to FIG. 1 of the drawings, a fluid system 10 is provided to control the actuation of a hydraulic clutch/brake mechanism 12. The fluid system 10 includes a source of pressurized fluid 14 that receives fluid from a reservoir 16 and delivers pressurized fluid therefrom through a conduit 17 to the hydraulic clutch/brake mechanism 12. A fluid control valve 18 is located in the conduit 17 between the source of pressurized fluid 14 and the hydraulic clutch/brake mechanism 12. The fluid control valve selectively controls the flow of pressurized fluid to the hydraulic clutch/brake mechanism 12. In the subject arrangement, the fluid control valve 18 is an electro-hydraulic valve that includes a valving element 20 that is located in the conduit 17 and an electronic controller 22 that controls movement of the valving element 20 based on various system parameters.

Figure 2:
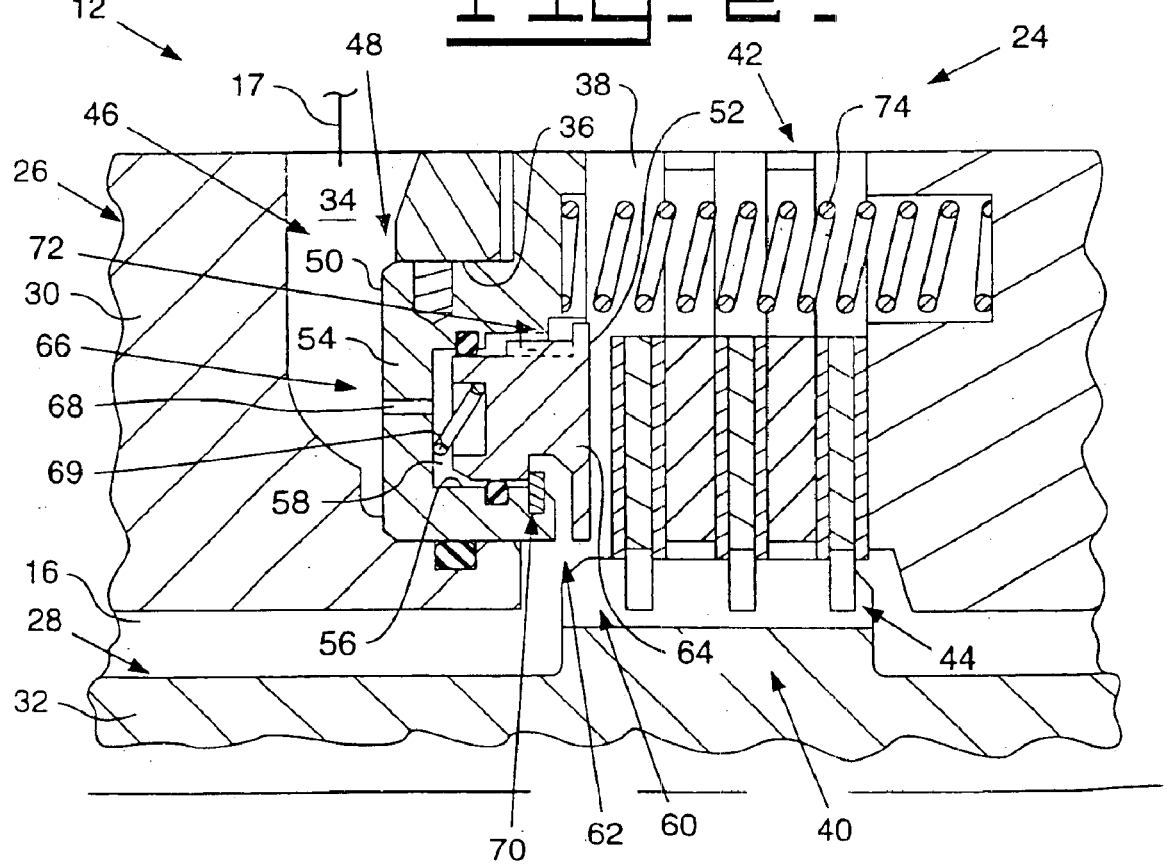
FIG. 2 is a diagrammatic representation of a portion of a hydraulic clutch/brake mechanism illustrated in its unactuated condition.

Referring to FIG. 2, a portion of the hydraulic clutch/brake mechanism 12 is illustrated. In the subject arrangement, the hydraulic clutch/brake mechanism 12 is illustrated as a clutch mechanism and will hereinafter be referred to as 'the clutch arrangement 12'. It is recognized that the following description would also be applicable in a brake mechanism without departing from the essence of the subject invention.

The clutch arrangement 12 includes an arrangement 24 having first and second means 26,28 for transmitting torque. The first torque transmitting means 26 includes a first transmitting member 30 and the second torque transmitting means 28 includes a second torque transmitting member 32.

The first torque transmitting member 30 included in the arrangement 24 defines a fluid inlet port 34, a piston bore 36, and a disk chamber 38. The fluid inlet port 34 is operatively connected to the conduit 17 of the fluid system 10.

A plurality of disks 40 is disposed in the disk chamber 38 of the first torque transmitting member 30 and has first and second disk portions 42,44 with the respective disks of each intermeshed one with the other. The first disk portion 42 is connected with the first torque transmitting member 30 and the second disk portion 44 is connected with the second torque transmitting member 32.

A means 46 for applying a force to the clutch arrangement 12 is disposed therein and includes an actuator piston assembly 48 disposed in the piston bore 36 of the first torque transmitting member 30. The actuator piston assembly 48 has a first side 50 in communication with the fluid inlet port 34 and a second side 52 located adjacent to the plurality of disks 40. The actuator piston assembly 48 includes a first piston 54 that is slideably disposed in the piston bore 36 of the first torque transmitting member 30. A blind bore 56 is defined in the first piston 54. The blind bore opens into the disk chamber 38 and defines a control chamber 58 at the bottom thereof.

A means 60 for damping the force applied to the plurality of disks 40 within the clutch arrangement 12 is disposed within the actuator piston assembly 48 of the force applying means 46. The force damping means 60 includes a damping arrangement 62. The damping arrangement 62 includes a second piston 64 that is slideably disposed in the blind bore 56 of the first piston 54 to define the control chamber 58. The side of the second piston 64 opposite to the control chamber 58 establishes the second side of the actuator piston assembly 48. The damping arrangement 62 also includes a means 66 for controlling communication of the control chamber 58 with the fluid inlet port 34. The communication controlling means 66 is in the form of an orifice 68 defined in the first piston 54 between the control chamber 58 defined therein and the first side 50 thereof. A first biasing member 69 is disposed in the control chamber 58 and operative to urge the second piston 64 in a direction towards the plurality of disks 40.

A retainer mechanism 70 in the form of a snap ring is disposed in one of the first and second pistons 54,64 and operative to retain the second piston 64 within the blind bore 56 of the first piston 54. In the subject arrangement, the snap ring 70 is disposed in the first piston 54. In order to prohibit the second piston 64 from rotating relative to the first piston 54, a spline arrangement 72 is operatively disposed between the first and second pistons 54,64.

A second biasing member 74 is disposed in the disk chamber 38 between one wall of the disk chamber and the first piston 54 and operative to urge the first piston 54 in a direction away from the plurality of disks 40.

It is recognized that during operation of the clutch arrangement 12 that both of the first and second torque transmitting members 30, 32 rotate relative to one another and that they rotate at different rates. Consequently, it is recognized that the pressurized fluid is routed to the fluid inlet port 34 in a manner that is not illustrated herein. There are various known arrangements in which pressurized fluid is routed through passageways in order to sealingly direct the pressurized fluid from the source of pressurized fluid 14 to the fluid inlet port 34 of the clutch arrangement 12. Therefore, additional illustrations and description of known apparatus has been omitted.

Additionally, it is envisioned that in order to establish when the end-of-fill has occurred, a position sensor 80 (see FIG. 1), such as a hall-effects sensor, could be located within the first and second pistons 54,64. Thus, when the second piston 64 bottoms within the blind bore 58 of the first piston 54, a signal representative of the position of the second piston 64 is delivered from the position sensor to the controller 22 of the fluid system 10. This end-of-fill position can then be used by the electronic controller 22 to aid in controlling the subject clutch/brake mechanism and/or other operating systems in a machine.

In the operation of the clutch arrangement 12 as illustrated in FIGS. 2–4 in cooperation with the fluid system of FIG. 1, pressurized fluid is controllably directed from the source of pressurized fluid 14 through the fluid control valve 18 to the fluid inlet port 34. The actuator piston assembly 48 moves from its initial, unactuated position, as illustrated in FIG. 1, towards an actuated position as illustrated in FIG. 4. The pressurized fluid acting on the first side 50 of the actuator piston assembly 48 urges the actuator piston assembly 48 towards the plurality of disks 40 against the bias of the second biasing member 74. During this movement, the fluid control valve 18 is in its open position to direct high fluid flow volume at a relatively low pressure to the fluid inlet port 34 so that the actuator piston assembly 48 quickly moves towards its end-of-fill position as illustrated in FIG. 4. In order to ensure that the actuator piston assembly 48 does not reach the end-of-fill position too soon or not soon enough, the damping arrangement 62 is utilized to damp the movement thereof. The damping arrangement 62 functions to control the rate of pressure increase in the inlet port 34 thus inhibiting premature harsh engagement of the plurality of disks 40.

Once the actuator piston assembly 48 reaches the position illustrated in FIG. 3, the second piston 64 makes initial contact with the plurality of disks 40. The second piston 64 acts to urge each of the disks into full, intimate contact with one another while the first piston 54 continues to move in a direction towards the plurality of disks 40. However, the second piston 64 does not act to apply full application force to the plurality of disks 40 since the second piston 64 is permitted to move against the bias of the first biasing member 69 into the blind bore 56 of the first piston 54. As the second piston 64 is being urged into the blind bore 56, the fluid within the control chamber 58 is controllably forced therefrom towards the fluid inlet port 34 through the orifice 68. Once the second piston 64 reaches the bottom of the blind bore 56, as illustrated in FIG. 4, end-of-fill has been reached and modulated application of the clutch arrangement 12 begins. During the modulation period, the plurality of disks 40 are progressively forced together to gradually increase the application of torque being transmitted therethrough.

It is recognized that in the illustration of FIG. 1, the respective disks thereof could be slightly spaced from one another. It is normally desirable to permit separation between the actuation piston assembly 48 and the respective disks of the plurality of disks 40 in order to reduce drag therein when the clutch arrangement 12 is in the released condition.

From the foregoing, it is readily apparent that a hydraulic clutch/brake mechanism 12 is provided that acts to damp the movement of the actuator piston assembly 48 relative to the plurality of disks 40 located therein. This ensures that the end-of-fill has been reached and the initiation of torque therethrough can begin. The subject invention eliminates the problem of excessive slippage when the actuator piston assembly 48 and the disks of the plurality of disks 40 have not reached full contact prior to the transmission of torque. Likewise, the subject invention eliminates the problem of sudden jerks when the actuator piston assembly 48 and the disks of the plurality of disks 40 are moved into forced contact prior to the transmission of torque.

Other aspects, objects and advantages of the invention can be obtained from a study of the drawings, the disclosure and the appended claims.

What is claimed is:

1. A hydraulic clutch/brake mechanism adapted for providing a smooth clutch/brake application, comprising:
    an arrangement including first and second torque transmitting members, a fluid inlet port, a piston bore in open communication with the fluid inlet port, and a disk chamber adjacent to the piston bore;
    a plurality of disks disposed in the disk chamber and intermeshed one with the other and having a first portion of the disks thereof connected with the first torque transmitting member and a second portion of the disks thereof connected with the second torque transmitting member;
    an actuator piston assembly slideably disposed in the piston bore, the actuator piston assembly having a first side in communication with the fluid inlet port and a second side disposed adjacent the plurality of disks; and
    a damping arrangement including a piston disposed in the actuator piston assembly and being operative during operation to damp the movement of the actuator piston assembly relative to the plurality of disks such that a rate of pressure increase applied against the plurality of disks is controlled to substantially prevent harsh engagement of the actuator piston assembly with the plurality of disks.

2. The hydraulic clutch/brake mechanism of claim 1 wherein the actuator piston assembly includes a first piston slideably disposed in the piston bore and the damping arrangement piston includes a second piston slideably disposed in the first piston and located adjacent to the plurality of disks.

3. The hydraulic clutch/brake mechanism of claim 2 wherein the first piston defines a blind bore therein opening into the disk chamber and an orifice defined therein between the blind bore and the fluid inlet port, the second piston being slideably disposed in the blind bore to define a control chamber between one end of the second piston and the bottom of the blind bore.

4. The hydraulic clutch/brake mechanism of claim 3 including a biasing member disposed in the control chamber between the one end of the second piston and the bottom of the blind bore.

5. The hydraulic clutch/brake mechanism of claim 4 including a second biasing member disposed in the disk chamber and being operative to bias the first piston in a direction away from the plurality of disks.

6. The hydraulic clutch/brake mechanism of claim 5 including a retainer mechanism disposed in one of the first and second pistons and operative to retain the second piston within the first piston.

7. The hydraulic clutch/brake mechanism of claim of claim 6 in combination with a fluid system having a source of pressurized fluid and a fluid control valve operative to controllably direct pressurized fluid to the clutch/brake mechanism.

8. The combination of claim 7 wherein the fluid control valve is an electrohydraulic fluid control valve.

9. A method of damping the actuation of a clutch/brake mechanism, including the steps of:
    providing an arrangement including first and second torque transmitting members, a fluid inlet port, a piston bore in open communication with the fluid inlet port, and a disk chamber adjacent to the piston bore;
    locating a plurality of disks in the chamber with a first portion of the disks thereof connected with the first torque transmitting member and a second portion of the disks thereof intermeshed with the first portion of the disks and connected with the second torque transmitting member;
    providing an actuator piston assembly slideably disposed in the piston bore between the fluid inlet port and the plurality of disks; and
    disposing a damping arrangement including a piston in the actuator piston assembly to damp the movement of the actuator piston assembly such that a rate of pressure increase applied against the plurality of disks is controlled to substantially prevent harsh engagement of the actuator piston assembly with the plurality of disks.

10. The method of claim 9 wherein the step of providing an actuator piston assembly includes providing a first piston slideably disposed in the piston bore and the step of disposing a damping arrangement including a piston in the actuator piston assembly includes providing a second piston slideably disposed in the first piston and being located adjacent to the plurality of disks.

11. The method of claim 10 wherein the step of disposing a damping arrangement includes providing an orifice in the first piston between the fluid inlet port and the second piston.

12. The method of claim 11 wherein the step of disposing a damping arrangement includes providing a biasing member in the first piston between the second piston and the first piston that is operative to urge the second piston in a direction towards the plurality of disks.

13. The method of claim 9 wherein the step of disposing a damping arrangement further includes signaling an end-of-fill condition.

\* \* \* \* \*